United States Patent [19]

Brown

[11] 4,358,645
[45] Nov. 9, 1982

[54] LOOP SENSING CIRCUIT FOR USE WITH A SUBSCRIBER LOOP INTERFACE CIRCUIT

[75] Inventor: Leland T. Brown, Phoenix, Ariz.

[73] Assignee: Motorola, Inc., Schaumburg, Ill.

[21] Appl. No.: 175,551

[22] Filed: Aug. 5, 1980

[51] Int. Cl.³ .............................................. H04B 1/58
[52] U.S. Cl. ........................ 179/170 NC; 179/16 AA; 179/170 T
[58] Field of Search .......... 179/16 A, 16 AA, 18 FA, 179/170 T, 170 NC, 18 F

[56] References Cited

U.S. PATENT DOCUMENTS 3,849,609 11/1974 Voorman ........................ 179/170 T
4,004,109 1/1977 Boxall ........................ 179/170 NC
4,203,012 5/1980 Boxall ........................ 179/170 T Primary Examiner—Robert S. Tupper
Assistant Examiner—Randall P. Myers
Attorney, Agent, or Firm—Michael D. Bingham

[57] ABSTRACT

A loop sensing circuit is coupled between a solid state hybrid circuit that provides signal conversion between a pair of unidirectional transmission paths and a bidirectional subscriber loop. The loop sensing circuit includes placing respective protection resistors coupled in parallel with first and second sensing resistors between the hybrid and the subscriber loop terminals to provide a dc current path between the bidirectional subscriber loop and the hybrid circuit.

6 Claims, 2 Drawing Figures

LOOP SENSING CIRCUIT FOR USE WITH A SUBSCRIBER LOOP INTERFACE CIRCUIT

FIELD OF THE INVENTION

This invention relates generally to telecommunications systems employing transformerless hybrid circuits typically referred to as subscriber loop interface circuits (SLICs) and more particularly to an improved loop sensing circuit to be used in combination therewith.

BACKGROUND OF THE PRIOR ART

Hybrid circuits, or SLICs, are known for providing signal conversion between a balanced two-wire, bidirectional subscriber loop and a pair of unidirectional transmission paths, the latter comprising an incoming signal path and an outgoing signal path. Typically, SLICs are employed in telephone communication systems between the central office equipment and the telephone hand set found in the subscriber loop as is understood.

U.S. Pat. No. 4,004,109 discloses such a hybrid circuit which comprises a plurality of current mirror circuits of complementary type which provides interface between the aforementioned transmission paths. In addition, U.S. Pat. No. 4,300,023, filed Aug. 13, 1979, entitled "Hybrid Circuit" to Kelley et al and assigned to Motorola Inc. describes a SLIC suitable for manufacture in integrated circuit form and further shows a loop sensing circuit for coupling between the SLIC and the bidirectional subscriber loop.

As explained later in greater detail, the loop sensing circuit includes a first pair of resistors serially coupled in a path to one loop terminal of the subscriber loop and a second pair of serially connected resistors coupled in the path to the other loop terminal. These paired resistors each include a protection resistor and a sensing resistor as is known and are coupled to particular terminals of the SLIC such that the loop sensing circuit provides impedance matching to the subscriber loop as well as protection to the monolithic SLIC against high voltage transients. The loop sensing circuit in combination with the SLIC provides longitudinal signal balanced to suppress longitudinal signals that may occur at the subscriber loop terminals.

As disclosed in the aforementioned Kelley et al patent, dc resistance matching between the SLIC and the subscriber loop is provided by paralleling the particular sensing resistor (R1 or R2) of each pair of serially connected resistor paths by a high current gain loop to effectively reduce the high resistive value of the sense resistor (approximately 16,000 ohms) to approximately 170 ohms which, in series with its respective protection resistor (R3 or R4) which has a value of 30 ohms, presents a balanced 400 ohm resistance, 200 ohms to each loop terminal, to the subscriber loop as generally is required. Because the value of each protection resistor is a large percentage of the dc resistance appearing at each loop terminals, it has been found that to maintain good longitudinal balance for suppressing longitudinal signals (while providing protection to the SLIC to secondary lightning strikes) the two protection resistors must be matched within approximately 0.1% of each other in value. Thus, the cost of these two protection resistors becomes substantial because of this matching tolerance along with the need for these resistors to dissipate large power transients due to proximate lightning strikes. Moreover, signal sensitivity is somewhat degraded between the subscriber loop and the SLIC of the prior art because of the serial connection of the two resistor paths.

Thus, a need exists for an improved loop sensing circuit for improving signal sensitivity while maintaining the system longitudinal signal suppression and reducing system costs.

BRIEF SUMMARY OF THE INVENTION

Accordingly, it is an object of the present invention to provide an improved loop sensing circuit for coupling between a hybrid circuit and a subscriber bidirectional loop.

It is another object of the present invention to provide a loop sensing circuit which is adapted to be coupled between a subscriber loop and a hybrid circuit to improve signal sensitivity therebetween while maintaining voltage transient protection to the hybrid circuit wherein circuit components thereof have relaxed matching tolerances.

In accordance with the foregoing and other objects, there is provided a loop sensing circuit for coupling between a subscriber loop interface circuit and a balanced bidirectional subscriber loop comprising protection and sensing resistors for coupling between the interface circuit and the subscriber loop wherein each protection resistors is placed within a respective high current gain loop in parallel with a respective one of the two sensing resistors.

It is a feature of the invention that by placing the two protection resistors in respective high current gain loops that the resistors can be standard 5% tolerance components or greater. Additionally, by placing each protection resistor in the high current gain loop in parallel with a particular sensing resistor, overall signal sensitivity between the balanced, bidirectional subscriber loop and the interface circuit is improved while maintaining good longitudinal signal suppression.

DETAILED DESCRIPTION OF THE PREFERRED EMBODIMENT

Figure 1:
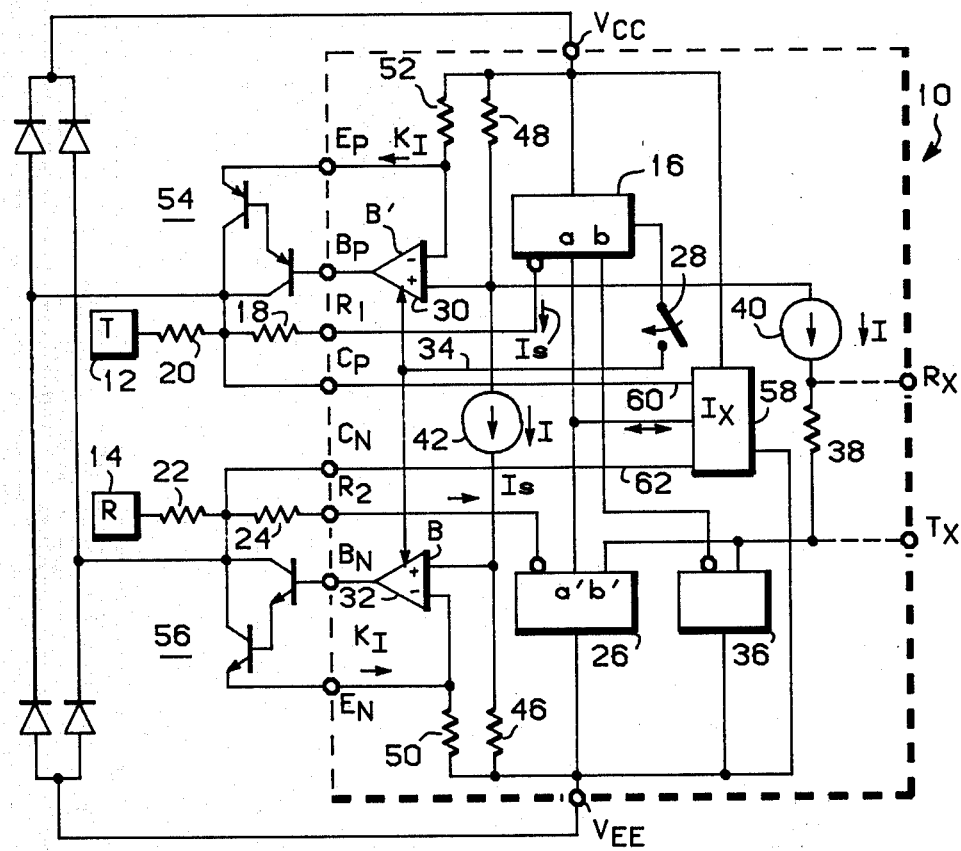
FIG. 1 is a partial block and schematic diagram illustrating a subscriber loop interface circuit and loop sensing circuit coupled thereto which is known in the prior art.

Turning to FIG. 1, there is shown a prior art signal transmission system including hybrid or subscriber loop interface circuit (SLIC) 10 for providing signal conversion between a balanced bidirectional subscriber loop and a pair of unidirectional transmission paths. For instance, hybrid circuit 10 may be a standard product which is manufactured by Motorola Inc. under the part number MC3419, a subscriber loop interface circuit. The bidirectional subscriber loop is coupled to the tip and ring (T and R) loop terminals 12 and 14 to hybrid circuit 10. As understood, the subscriber loop typically includes a telephone handset such that when the set is taken off the hook an impedance or load resistant RL is placed in series between terminals 12 and 14. A loop sensing circuit is coupled between terminals 12 and 14 to the SLIC such that incoming unidirectional signals applied to terminal $R_X$ are coupled to the tip terminal and the outgoing signals generated at the subscriber loop are coupled via SLIC 10 to the unidirectional transmission path at terminal $T_X$. As understood, SLIC, or hybrid circuit 10 is suitable to be manufactured in integrated circuit form and comprises a plurality of current mirror circuits of complementary types as will be briefly explained. The operation of the system of FIG. 1 in described in great detail in the aforereferenced Kelley et al patent. Additionally, the general operation of a hybrid circuit is also described in the aforementioned U.S. Pat. No. 4,004,109. The teachings of both of the foregoing references are incorporated herein by reference.

In operation, with the telephone handset off hook, dc current is sourced at the input of current mirror 16 (the input of all the current mirror circuits being designated by a small circle) to the tip terminal 12 through serially connected resistors 18 and 20. The dc current flows through RL back to ring terminal 14 through serially connected resistors 22 and 24 to the input of current mirror circuit 26. As understood, resistors 18 and 24 are generally defined as being sensing resistors R1 and R2 respectively while resistors 20 and 22 are designated as protection resistors R3 and R4 respectively. The dc current flow through the subscriber loop causes closing of a bias control switch 28 to render operational amplifiers 30 and 32 operative via lead 34 such that the unidirectional receive path as well as the unidirectional transmit path are coupled to the subscriber loop. Current mirror circuits 16, 26 and 36 are generally known as the A', A and A" circuits, and operational amplifiers 30 and 32 as B' and B circuits respectively. The currents flowing out of current mirror circuits 16, 26 and 36 are generally in proportion to the input current respectively as designated by the small case lettering a and b of current mirror circuits 16 and 26. Ideally, current mirror circuits 16 and 26 are matched such that the input current IS which is sourced by current mirror circuit 16 is completely sunk at the input of current mirror circuit 26. The input currents of current mirror circuit 16 and 26 produce proportional output currents at terminals a, a' and b and b' as known. If the system is perfectly balanced, the current source at output terminal a of current mirror circuit 16 is completely sunk at output terminal a' of complementary type current mirror circuit 26. The output current at terminal b of current mirror circuit 16 flows to the input terminal of current mirror circuit 36 to produce an output current at the output thereof which is summed with the output current appearing at terminal b' of current mirror 26. This causes a dc current flow through resistor 38 from current source 40 having a magnitude equal to I. Current source 40 being operative renders current source 42 operative to source a current of value I, over lead 44, through resistor 46 to the $V_{EE}$ terminal via resistor 48 which is coupled to the $V_{CC}$ terminal. As understood, by scaling resistors 50 and 52 to resistors 46 and 48 respectively, a current KI is caused to flow through respective Darlington amplifiers 54 and 56 in operation with op amps 30 and 32. The foregoing Darlington amplifiers with respective op amp comprise two high current gain loops which, as seen, are placed in parallel with respective sensing resistor R1 and R2.

Typically, the current gain of the A and A' mirror circuits A to the $T_X$ output is equal to a contant value K1. The current gain of the B circuits including op amps 30 and 32 is equal to a constant K2. Thus, it can be shown that the dc resistance appearing at the tip and ring terminals 12 and 14 is equal to:

$$R_F = \frac{(R1 + R2)}{1 + K1\,K2} + R3 + R4 \qquad (1)$$

In order to provide good loop balance the value of R1 plus R3, which is equal to half the loop resistance, must be equal to the value of R2 plus R4. As previously mentioned, R1 and R2 are typically 16000 ohms while R3 and R4 are 30 ohm resistors. However, by placing sensing resistors R1 and R2 in parallel with respective high current gain loops the resistance appearing in series with resistors R3 and R4 (20 and 22) is equal to approximately 170 ohms so that between respective terminals R1, R2 and 12, 14 there appears 200 ohms of dc resistance.

Longitudinal or common mode signal suppression appearing at the loop terminals 12 and 14 is provided in combination with an error-detecting circuit 58 which is also known as circuit C. In response to common mode voltage signals appearing at loop terminals 12 and 14, out of phase current signals are produced through sensing resistors 18, 24 through circuits A and A' which cause a mismatch between the output terminals a and a' thereof. This establishes an ac current signal ix at the Ix terminal of circuit 58 to produce currents in leads 60 and 62 which reduce the common mode signal component at nodes CN and CP by the open loop ac gain of the C circuit; which is quite large.

However, a problem with the prior art loop sensing circuit arises because of the serial connection of R1, R3 and R2, R4. As previously mentioned, for good longitudinal balance, R3 and R4 must be matched within 0.1% tolerance. Additionally, in order to protect the system to secondary lightning strikes, R3 and R4 as well as the shown diode bridge must be capable of dissipating high voltage transients. High voltage transients have been found to cause enough variation in the resistance of R3 and R4 to seriously degrade the longitudinal balance of the signal conversion system by affecting the aforedescribed tolerance, which in turn, seriously degrades longitudinal signal suppression of the system of FIG. 1 which is undesirable.

Figure 2:
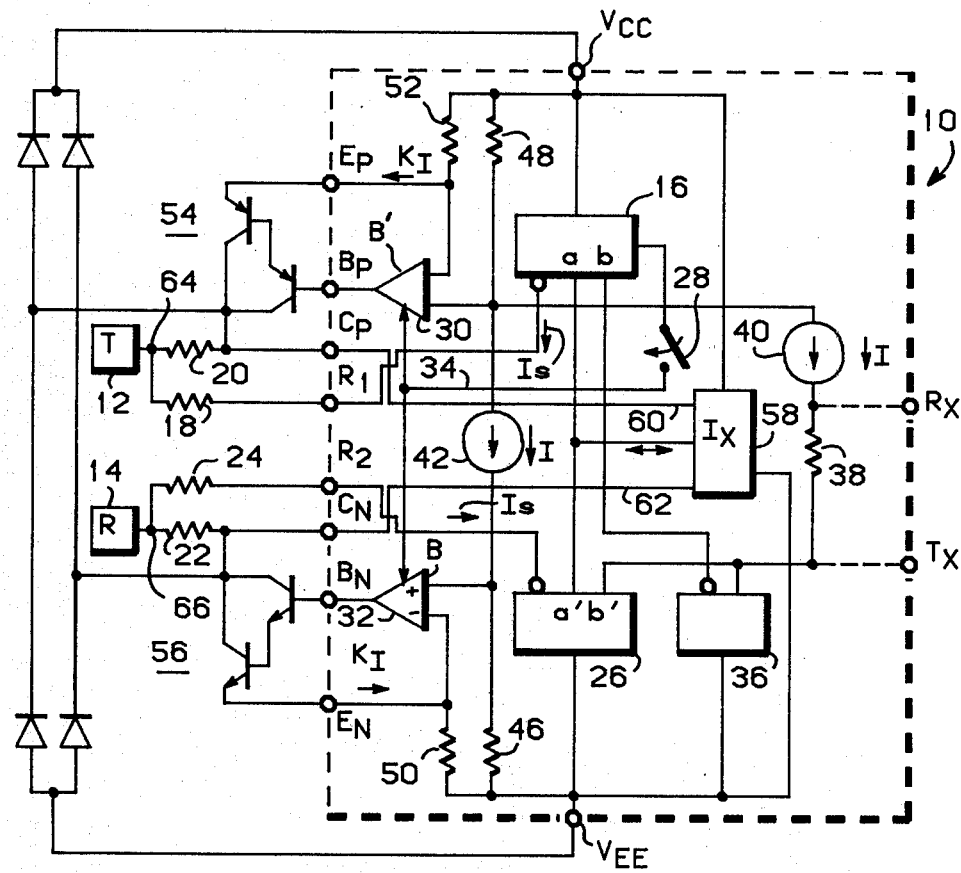
FIG. 2 is a partial block and schematic diagram form illustrating the preferred embodiment of the present invention.

Turning now to FIG. 2, there is shown a signal conversion system wherein the need for high precision resistors R3 and R4 has been eliminated in order to reduce system costs while maintaining longitudinal balance and improving signal sensitivity. As shown, like components in FIG. 2 to FIG. 1 are numbered the same as the corresponding components in FIG. 1.

The operation of hybrid 10 for providing signal conversion is the same as previously described and is understood. The significant difference between the embodiment of the present invention is that R3 and R4 (resistors 20 and 22) have been placed within the high current gain loop comprising the B and C circuit loops which eliminates the need for these two resistors to be precision matched components. Thus, with R3 being placed within the high current gain loop between the output of Darlington amplifier 54 and node 64 and with resistors R4 placed between Darlington amplifier 56 and node 66, variations in the value of R3 and R4 do not affect a longitudinal balance of the system. In fact, it can be shown that the effective dc resistance is now equal to:

$$R_{F(new)} = \frac{R1 + R2}{1 + K1\,K2} \quad (2)$$

if R3 and R4 have a value of less than $R_F/2$. Therefore with R3 and R4 placed within high current gain loops, the longitudinal balance is no longer effected by R3 and R4 but by the gain of the longitudinal circuit and R1 and R2.

Additionally, with resistors 18 and 24 (R1 and R2) placed in parallel with the respective protection resistors 20 and 22 instead of in series therewith, improved signal sensitivity is obtained since no signal portion is lost from the tip and ring terminals 12 and 14 through resistors 20 and 22.

Therefore, what has been described is an improved loop sensing circuit for use in combination with a subscriber loop interface circuit which eliminates the need for precision tolerance power resistors while improving system signal sensitivity. In fact, the preferred embodiment of the present invention requires only 5% standard power resistors to be utilized.

I claim:

1. A loop sensing circuit for coupling between a hybrid circuit and a subscriber bidirectional transmission loop, the hybrid circuit including first and second complementary type current mirror circuits and first and second high current gain amplifiers, comprising:

first high current gain loop means coupled between a first one of the high current gain amplifiers of the hybrid circuit and a first node to a first loop terminal adapted to be coupled to the subscriber transmission loop, said first high current gain loop including first resistive means;

second resistive means coupled between said first node and an input of the hybrid circuit that is adapted to be coupled to an input of the first current mirror circuit of the hybrid circuit for conducting current therebetween;

third resistive means coupled between a second node to a second loop terminal that is adapted to be coupled to the subscriber transmission loop and an input of the hybrid circuit that is adapted to be coupled to an input of the second current mirror circuit of the hybrid circuit for conducting current therebetween; and second high current gain loop means coupled between the second one of the high current gain amplifiers of the hybrid circuit and said second node and including fourth resistive means.

2. The loop sensing circuit of claim 1 wherein said first high current gain loop means includes a first Darlington amplifier coupled between said first resistive means and the first high current gain amplifier of the hybrid circuit.

3. The loop sensing circuit of claim 2 wherein said second high current gain loop means includes a second Darlington amplifier coupled between said fourth resistive means and the second high current gain amplifier of the hybrid circuit.

4. In a signal conversion system including a hybrid circuit for providing signal conversion between a pair of unidirectional transmission paths and a bidirectional subscriber loop and having a plurality of low current mirror circuits of complementary conductivity type and first and second high current gain circuits, a loop sensing circuit including first and second sensing resistors and first and second protection resistors, the improvement comprising said first and second protection resistors being coupled between the first and second high current gain circuits respectively and first and second loop terminals adapted to be connected to the bidirectional subscriber loop, the first sensing resistor being coupled between the first loop terminal and an input of a first one of the low current mirror circuits of the hybrid circuit, the second sensing resistor being coupled between the second loop terminal and the input of another one of the low current mirror circuits of the hybrid circuit which is of complimentary type of said first current mirror circuit such that a dc current flows therebetween whenever a load resistance is coupled between the first and second loop terminals.

5. The signal conversion system of claim 4 further including first and second Darlington amplifiers coupled between the first and second protection resistors respectively to the first and second high current gain circuits.

6. In a signal conversion system for providing signal conversion between a bidirectional subscriber loop and a pair of unidirectional transmission paths including a solid state subscriber loop interface circuit (SLIC) having first and second terminals coupled respectively to each one of the unidirectional transmission paths, the SLIC including complimentary types of low current gain current sources and high current gain sources, the system including a pair of sensing resistors each coupled between a respective side of the subscriber loop to the SLIC for providing a direct current transmission path in conjunction with the complimentary type low current gain current sources, the improvement comprising first and second protection resistors each coupled between a respective side of the subscriber loop to a respective one of the high current gain current sources such that a pair of high current gain loops are placed essentially in parallel with each one of said pair of sensing resistors.

* * * * *